United States Patent
Oron et al.

(10) Patent No.: US 11,115,718 B2
(45) Date of Patent: Sep. 7, 2021

(54) VIRTUAL REALITY IMAGING SYSTEM

(71) Applicants: Roi Oron, Tel Aviv (IL); Guy Zisman, Ramat Gan (IL); Amir Segev, Rannana (IL)

(72) Inventors: Roi Oron, Tel Aviv (IL); Guy Zisman, Ramat Gan (IL); Amir Segev, Rannana (IL)

(73) Assignee: TEXEL LIVE LTD., Tel Aviv (IL)

( * ) Notice: Subject to any disclaimer, the term of this patent is extended or adjusted under 35 U.S.C. 154(b) by 0 days.

(21) Appl. No.: 16/494,400

(22) PCT Filed: May 1, 2018

(86) PCT No.: PCT/IL2018/050479
§ 371 (c)(1),
(2) Date: Sep. 16, 2019

(87) PCT Pub. No.: WO2018/203333
PCT Pub. Date: Nov. 8, 2018

(65) Prior Publication Data
US 2020/0092513 A1    Mar. 19, 2020

Related U.S. Application Data

(60) Provisional application No. 62/492,186, filed on Apr. 30, 2017.

(51) Int. Cl.
| | | |
|---|---|---|
| *H04N 21/47* | (2011.01) | |
| *H04N 21/478* | (2011.01) | |
| *H04N 21/482* | (2011.01) | |
| *H04N 21/61* | (2011.01) | |
| *H04N 21/6587* | (2011.01) | |
| *G06T 15/00* | (2011.01) | |
| *G06T 19/00* | (2011.01) | |

(Continued)

(52) U.S. Cl.
CPC .............. *H04N 21/47* (2013.01); *A63F 13/30* (2014.09); *H04N 19/61* (2014.11); *H04N 21/4781* (2013.01); *H04N 21/482* (2013.01); *H04N 21/6125* (2013.01); *H04N 21/6587* (2013.01)

(58) Field of Classification Search
CPC .......... G06F 3/011; G06F 3/017; G06F 3/012; G06F 3/013; G06F 3/04815; G06F 3/04842; G06F 3/0304; G06F 3/0346; G06F 3/167; H04N 21/816
See application file for complete search history.

(56) References Cited

U.S. PATENT DOCUMENTS

| | | | | |
|---|---|---|---|---|
| 9,595,083 | B1* | 3/2017 | Smith | ............ G06F 3/012 |
| 2016/0299563 | A1* | 10/2016 | Stafford | ............ G02B 27/017 |
| 2017/0180800 | A1* | 6/2017 | Mayrand | .......... H04N 21/25858 |

* cited by examiner

*Primary Examiner* — Hsiungfei Peng
(74) *Attorney, Agent, or Firm* — Reches Patent

(57) ABSTRACT

A device and methods are disclosed for delivering video content to an end user comprising: a. a source of video content comprising a sequence of scenes; b. a transmitter for transmitting said video content; c. a receiver for receiving the video content and displaying the video content to the end user; d. a feedback unit for sensing a user's journey; e. a processor preprogrammed to modify the video content to be transmitted according to sensed user's journey; wherein the processor is configured to analyze sensed user's activity and predict user's journey in future such that a portion of video content which has highest predicted watchability by the user is transmitted and displayed.

17 Claims, 3 Drawing Sheets

(51) Int. Cl.
*A63F 13/30* (2014.01)
*H04N 19/61* (2014.01)

VIRTUAL REALITY IMAGING SYSTEM

FIELD OF THE INVENTION

The present invention relates to a system for transmitting and displaying and enriching interactively video and audio generating a fully surrounding Virtual Reality experience to a user and, more particularly, a system of virtual reality establishing a user's profile and providing video content according to the established user's profile.

BACKGROUND

Nowadays, the market of 360° virtual reality videos faces many challenges such as hardware performance, content adaptability and software compatibility. The problem of the streaming technology usable for skip-free delivering video content is not solved in a cost-effective manner. The aforesaid problem is most relevant to mobile devices because the majority of internet users tie into the network by means of mobile devices.

U.S. Pat. No. 7,620,734 discloses a foveating system which transmits one or more dynamic multifoveated images (i.e., a variable resolution image) from a foveating proxy server to a client computer or viewer via one or more surrogate proxy servers. A client computer is able to request only those portions of an image that the user desires to view rather than having to download the entire image. Accordingly, the foveated images can be transmitted to be rendered by the client computer in a manner appropriate for foveal viewing. Specifically, low-resolution images are initially sent to be viewed by the client computer as they are received. Thereafter, higher resolution portions of the original image can be sent in response to the user's request(s) and can be displayed by the client computer as an update to the displayed image.

US 20070033634 discloses a method enabling to render mass-market content information to a user. The method enables using a profile of the user for controlling electronic content for the purpose of personalizing the rendering during play-out of the content.

The prior art documents provide an apparatus configured for establishing a correspondence between a current position of the user and a foveated image to be displayed to the user. Thereat, a user's profile of the user is used for personalizing the rendering during play-out of the content.

Thus, there is a long-felt and unmet need for not only collecting a set of feedbacks from the end users (from the video player): video quality, delay, churn, viewing time, interaction, viewing angles, overall journey, profiles, available bandwidth on the fly but also analyzing the obtained data in terms of correspondence to a plurality of predetermined profiles of the content which provide different experiences.

Each user is linked to a content cluster which is characterized by a relevant content according to the user's profile. Thereat, content characterization can be changed on the fly regarding end users actions or feedback.

BRIEF SUMMARY OF THE INVENTION

It is hence one object of the invention to disclose a device for delivering a video content to an end user. The aforesaid device comprises: (a) a source of video content; the video content comprising a sequence of scenes; (b) a transmitter configured for transmitting the video content; (c) a receiver configured for receiving the video content and displaying the video content to the end user; (d) a feedback unit configured for sensing a user's journey; and (e) a processor preprogrammed to modify the video content to be transmitted according to sensed user's journey. It is a core purpose of the invention to provide the processor configured to analyze sensed user's journey and predict user's journey in future such that a portion of video content which has highest predicted watchability by the user is transmitted by the transmitter and displayed by the receiver.

Another object of the invention is to disclose the processor configured to analyze sensed user's journey in response to displaying each scene of said sequence and predict user's journey within a next scene of said sequence.

A further object of the invention is to disclose the processor comprising a long-term memory for storing a plurality of predetermined user's profiles. The processor is preprogrammed to compare the sensed user's journey with the predetermined user's profiles, select a most suitable and modify the video content to be transmitted accordingly.

A further object of the invention is to disclose the processor configured to analyze sensed user's journey, to classify consumed video content and to indicate user's fields of interest.

A further object of the invention is to disclose the sensed user's journey selected from the group consisting of video resolution, field of view, viewing time, viewing angles, overall journey, currently available bandwidth, average bit rate, switching between profiles, engagement, device type and any combination thereof.

A further object of the invention is to disclose the feedback unit configured for identifying said end user.

A further object of the invention is to disclose the scene comprising at least one video frame.

A further object of the invention is to disclose the processor preprogrammed for foveated rendering the plurality of scenes according to the sensed user's journey.

A further object of the invention is to disclose a method of delivering a video content to an end user. The aforesaid method comprises the steps: (a) providing a device for delivering video content to an end user further comprising: (i) a source of video content; the video content comprising a plurality of scenes; (ii) a transmitter configured for transmitting the video content; (iii) a receiver configured for receiving the video content and displaying the video content to the end user; (iv) a feedback unit configured for sensing an user's journey; (v) a processor preprogrammed to modify the video content to be transmitted according to sensed user's journey; the processor is configured to analyze sensed user's journey and predict user's journey in future such that a portion of video content which has highest predicted watchability by the user is transmitted by the transmitter and displayed by the receiver; (b) successively transmitting the sequence of scenes and displaying the sequence of scenes to the end user; (c) sensing user's journey in response to displaying every scene of said sequence; (d) analyzing said sensed user's journey; (e) predicting an user's journey related to a next scene; and (t) modifying every succeeding scene according to sensed user's journey in response to every preceding scene.

A further object of the invention is to disclose the method comprising a step of comparing the sensed user's journey with the predetermined user's profiles, selecting a most suitable and modifying the video content to be transmitted accordingly.

A further object of the invention is to disclose the method comprising a step of analyzing sensed user's journey, classifying consumed video content and indicating user's fields of interest. A further object of the invention is to disclose the step of modifying comprising foveated rendering the sequence of scenes according to the sensed user's journey.

A further object of the invention is to disclose the method comprising a step of identifying said end user.

BRIEF DESCRIPTION OF THE DRAWINGS

In order to understand the invention and to see how it may be implemented in practice, a plurality of embodiments is adapted to now be described, by way of non-limiting example only, with reference to the accompanying drawings, in which.

DETAILED DESCRIPTION OF THE INVENTION

The following description is provided, so as to enable any person skilled in the art to make use of said invention and sets forth the best modes contemplated by the inventor of carrying out this invention. Various modifications, however, are adapted to remain apparent to those skilled in the art, since the generic principles of the present invention have been defined specifically to provide a device for delivering video content to an end user and a method of doing the same.

The term "end-user's profile (EUP)" hereinafter refers to a set of parameters characterizing a user's journey such as requested video resolution, field of view, viewing time, viewing angles, and currently available bandwidth. Personal details are also askable from the end user and lie in the scope of the term.

The term "video content" hereinafter refers to video content per se, virtual reality, including 360° virtual reality, augmented reality, volumetric video, video with depth map and any combination thereof.

The term "modification of video content" hereinafter refers to reduction, change in shape, adaptation, enrichment, combination of different video frames or marking of the video content to be displayed to an end user. All modifications are made on the top of the existing video flow without encoding/transcoding. Content enrichment based on revealed user's fields of interest can include auxiliary maps and indicative points visualizing assisting content relevant to the aforesaid user's fields of interest.

The term "user's journey" hereinafter refers to a user's activity definable by a vector of sight, body movement or gestures, switching between scenes within the same piece of video content or switching between different pieces of video content, shooting angles and camera locations can be an option of the service provided by the present invention. Interactive augmenting and tiling of the provided video content can also be a part of the abovementioned term "user's journey".

Figure 1:
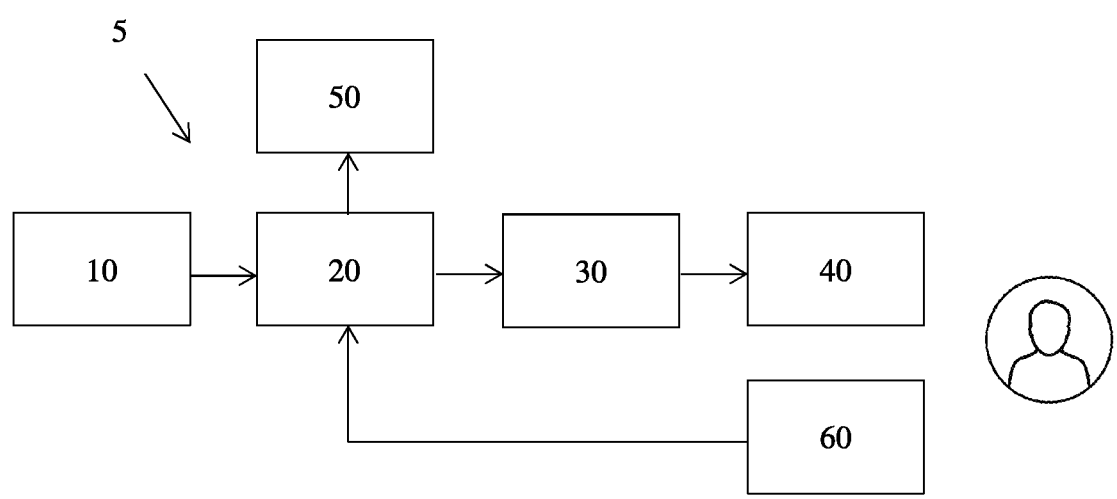
FIG. 1 is a schematic diagram of a device for delivering video content to an end user.

Reference is now made to FIG. 1 presenting a schematic diagram of a device for device 5 for delivering video content to an end user. According to an exemplary embodiment of the present invention, device 5 comprises: source 10 of video content which can be constitute a cloud-based or localized video service provider, a localized memory unit or alike. The video content fed by source 10 of video content is transmitted by transmitter 30 to receiver 40. According to one embodiment of the present invention, source 10 can be embodied as a remote client server providing availability of video content. A source of video localized in the proximity (embedded in) of receiver 40 is also in the scope of the present invention. In present invention, receiver 40 is defined as a unit configured for receiving the video content and displaying the video content to an end user. Feedback unit 60 senses a user's journey taken by the end user in response displaying to him/her the video content. The obtained data concerning the sensed user's journey is sent to processor 20 preprogrammed to modify the video content to be transmitted according to sensed user's journey. As mentioned above, there is no need in at any specific time to provide a full-scale 360° scene. High resolution image should be provided only in scope of instantaneous end-user's field of view. Thus, image frames can be modified according to the aforesaid instantaneous end-user's field of view. Processor 20 is configured to analyze sensed user's journey and most notably predict user's journey in future. Processor 20 defines a portion of video content (according to accepted terminology (foveated rendering) which is most probable to be watchable by the user and only the modified image frame is transmitted by transmitter 30 and displayed by receiver 40. Memory unit 50 comprises a plurality of typical EUPs corresponding to different types of end users. Processor 20 comparatively analyzes the obtained data concerning the sensed user's journey in order to select a most relevant EUP. It should be emphasized that sensing and analyzing obtained user's journey data is carried out in real time, and therefore, switching between different typical EUPs can be made accordingly. Source 10 of video content, processor 20, transmitter 30, receiver 40, feedback unit 50 and memory unit can be arranged in an integral manner or separately in any combination.

Figure 2:
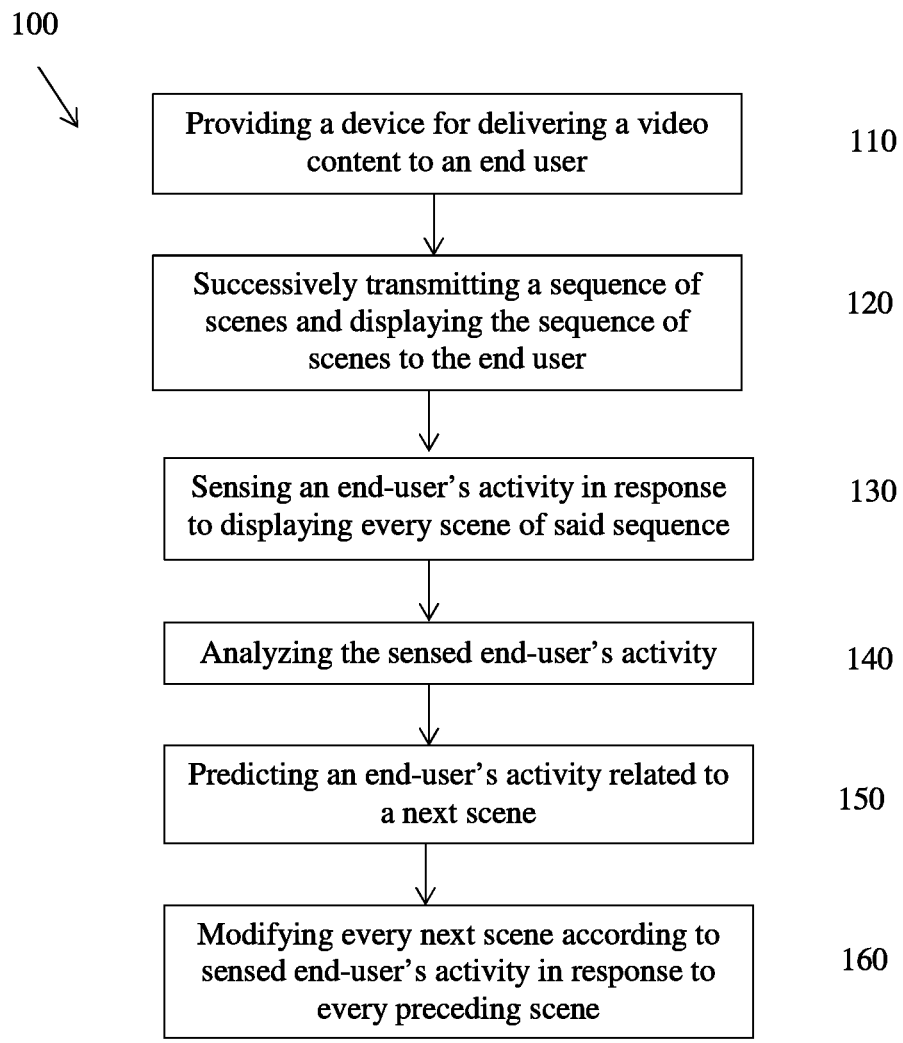
FIG. 2 is a flowchart of a method of delivering video content to an end user.

Reference is now made to FIG. 2 presenting method 100 of delivering a video content to an end user. At starting step 110, a device for delivering video content to an end user is provided. The transmitter starts transmitting a sequence of video scenes fed by a source of video content (step 120). The feedback unit senses a user's journey made in response to displaying to him/her the aforesaid sequence of video scenes (step 130).). The obtained data concerning the user's journey are analyzed at step 140. Then, a prediction of a user's journey related to a next scene is established (step 150). Advantageously, the next video scene is modified in accordance with the established prediction (step 160). As mentioned above, a memory unit can comprise a plurality of typical EUPs corresponding to different types of end users. Therefore, the prediction of the user's journey relevant to the next scene can be made on the basis of selection of a most EUP.

According to one embodiment, an end user is identified by the device of the present invention and content is delivered according to a previously formed EUP. Updating the formed EUP by means of a machine learning algorithms is also in the scope of the present invention.

Figure 3:
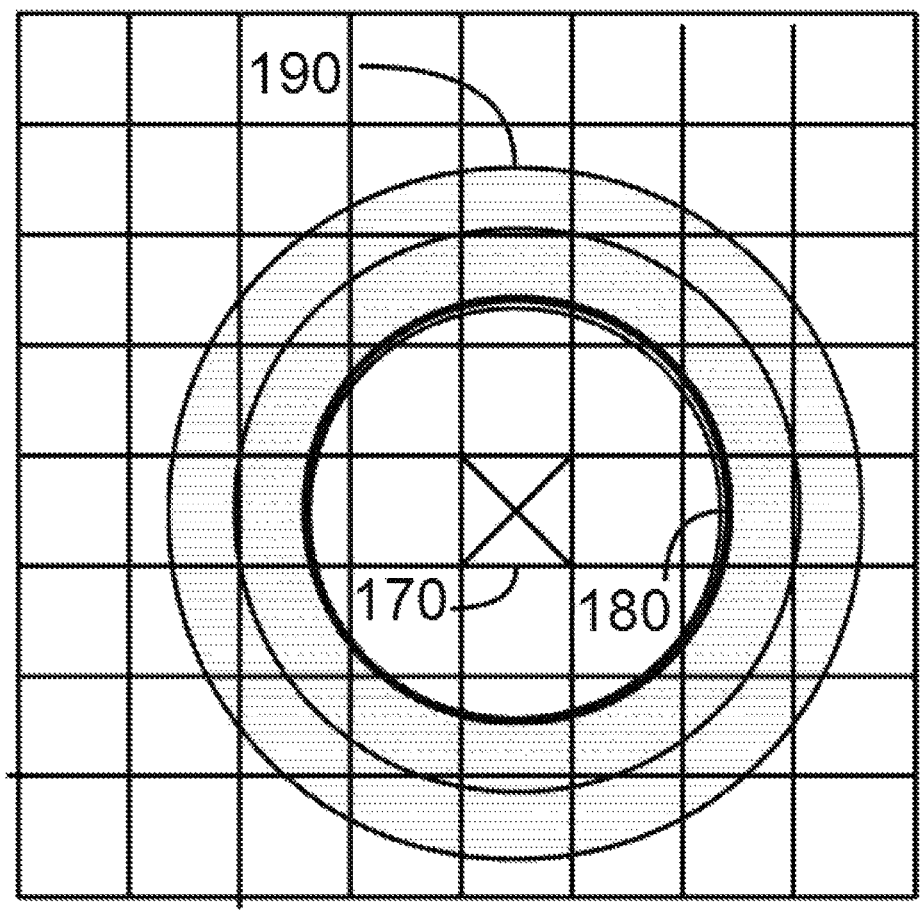
FIG. 3 is a schematic presentation of a video scene to be delivered to an end user.

Reference is now made to FIG. 3 showing an exemplary implementation of foveated rendering the content to be delivered. In the case when coordinates of the "next scene" are determined, pixel 170 (indicated by an X sign) forms a center of the scene. A circular area around pixel 170 is modified in a maximal manner, while an extent of modification of peripheral annuluses 180 and 190 spaced apart from pixel 170 decreases with the distance from pixel 170. The use of Foveated-Streaming (based on foveated-rendering approach) eases load both on network and GPU and thus bypasses bottlenecks leading to latency low frame rate and nausea.

The present invention can be implemented using graphics processing units (GPU) such as available on the market for PCs, game consoles, mobile phones workstations, etc. Such units use frame buffers to deliver images in complete frames.

According to the invention, a device for delivering video content to an end user is disclosed. The aforesaid device comprises: (a) a source of video content; the video content comprising a sequence of scenes; (b) a transmitter configured for transmitting the video content; (c) a receiver configured for receiving the video content and displaying the video content to the end user; (d) a feedback unit configured for sensing a user's journey; and (e) a processor preprogrammed to modify the video content to be transmitted according to sensed user's journey.

It is a core feature of the invention to provide the processor configured to analyze sensed user's journey and predict user's journey in future such that a portion of video content which has highest predicted watchability by the user is transmitted by the transmitter and displayed by the receiver.

According to one embodiment of the present invention, the processor is configured to analyze sensed user's journey in response to displaying each scene of said sequence and predict user's journey within a next scene of said sequence.

According to another embodiment of the present invention, the processor comprises a long-term memory for storing a plurality of predetermined user's profiles. The processor is preprogrammed to compare the sensed user's journey with the predetermined user's profiles, select a most suitable and modify the video content to be transmitted accordingly.

According to a further embodiment of the present invention, the processor is configured to analyze sensed user's journey, to classify consumed video content and to indicate user's fields of interest.

According to a further embodiment of the present invention, the sensed user's journey is selected from the group consisting of video resolution, field of view, viewing time, viewing angles, currently available bandwidth, average bit rate, switching between profiles, engagement, device type and any combination thereof.

Creating big databases for storing databulk concerning the end-user profiles usable for business intelligence gathering is also in the scope of the present invention.

According to a further embodiment of the present invention, the feedback unit is configured for identifying said end user.

According to a further embodiment of the present invention, the scene comprises at least one video frame.

According to a further embodiment of the present invention, the processor is preprogrammed for foveated rendering the plurality of scenes according to the sensed user's journey.

According to a further embodiment of the present invention, a method of delivering a video content to an end user is disclosed. The aforesaid method comprises the steps: (a) providing a device for delivering a video content to an end user further comprising: (i) a source of video content; the video content comprising a plurality of scenes; (ii) a transmitter configured for transmitting the video content; (iii) a receiver configured for receiving the video content and displaying the video content to the end user; (iv) a feedback unit configured for sensing a user's journey of the end user; (v) a processor preprogrammed to modify the video content to be transmitted according to sensed user's journey; the processor is configured to analyze sensed user's journey and predict user's journey in future such that a portion of video content which has highest predicted watchability by the user is transmitted by the transmitter and displayed by the receiver; (b) successively transmitting the sequence of scenes and displaying the sequence of scenes to the end user; (c) sensing user's journey in response to displaying every scene of said sequence; (d) analyzing said sensed user's journey; (e) predicting a user's journey related to a next scene; and (f) modifying every succeeding scene according to sensed user's journey in response to every preceding scene.

According to a further embodiment of the present invention, the method comprises a step of comparing the sensed user's journey with the predetermined user's profiles, selecting a most suitable and modifying the video content to be transmitted accordingly.

According to a further embodiment of the present invention, the method comprises a step of analyzing sensed user's journey, classifying consumed video content and indicating user's fields of interest.

According to a further embodiment of the present invention, the step of modifying comprises foveated rendering the sequence of scenes according to the sensed user's journey.

What is claimed is:

1. A device for delivering video content to an end user comprising:
   a. a source of video content; said video content comprising a sequence of scenes;
   b. a transmitter configured for transmitting said video content;
   c. a receiver configured for receiving said video content and displaying said video content to said end user;
   d. a feedback unit configured for sensing a user's journey;
   e. a processor preprogrammed to modify said video content to be transmitted according to sensed user's journey; wherein said processor comprises a memory for storing a plurality of predetermined user's profiles; wherein each predetermined user's profile comprises at least one out of requested video resolution and currently available bandwidth; wherein said processor is configured to analyze sensed user's activity, compare said sensed user's journey with said predetermined user's profiles, select a most suitable and modify said video content to be transmitted accordingly, and predict user's journey in future such that a portion of video content which has highest predicted watchability by said user is transmitted by said transmitter and displayed by said receiver;
   wherein said processor is further configured to analyze sensed user's journey to classify consumed video content and to indicate user's fields of interest; modify the video content to be transmitted by an enrichment of the video content, the enrichment is based on the user's fields of interest; wherein the enrichment comprises providing auxiliary maps and points visualizing assisting content relevant to the user's fields of interest.

2. The device according to claim 1, wherein said processor is configured to analyze sensed user's journey in response to displaying each scene of said sequence and predict user's journey within a next scene of said sequence.

3. The device according to claim 1, wherein each of said predetermined user's profiles comprises a combination of requested video resolution and currently available bandwidth.

4. The device according to claim 1, wherein said sensed user's journey is selected from the group consisting of video resolution, field of view, viewing time, viewing angles, currently available bandwidth and any combination thereof.

5. The device according to claim 1, wherein said feedback unit is configured for identifying said end user.

6. The device according to claim 1, wherein said scene comprises at least one video frame.

7. The device according to claim 1, wherein said processor is preprogrammed for foveated rendering said plurality of scenes according to said sensed user's journey.

8. A method of delivering video content to an end user; said method comprising the steps:
   a. providing a device for delivering a video content to an end user further comprising:
      i. a source of video content; said video content comprising a plurality of scenes;
      ii. a transmitter configured for transmitting said video content;
      iii. a receiver configured for receiving said video content and displaying said video content to said end user;
      iv. a feedback unit configured for sensing a user's journey;
      v. a processor preprogrammed to modify said video content to be transmitted according to sensed user's journey; wherein said processor comprises a memory for storing a plurality of predetermined user's profiles; wherein each predetermined user's profile comprises at least one out of requested video resolution and currently available bandwidth; said processor is configured to analyze sensed user's journey and predict user's journey in future such that a portion of video content which has highest predicted watchability by said user is transmitted by said transmitter and displayed by said receiver;
   b. successively transmitting said sequence of scenes and displaying said sequence of scenes to said end user;
   c. sensing user's journey in response to displaying every scene of said sequence;
   d. analyzing said sensed user's journey;
   e. comparing said sensed user's journey with said predetermined user's profiles;
   f. selecting a most suitable and modify said video content to be transmitted accordingly;
   g. predicting a user's journey related to a next scene; and
   h. modifying every next scene according to sensed user's journey in response to every preceding scene;
   wherein said processor is further configured to analyze sensed user's journey to classify consumed video content and to indicate user's fields of interest; modify the video content to be transmitted by an enrichment of the video content, the enrichment is based on the user's fields of interest; wherein the enrichment comprises providing auxiliary maps and points visualizing assisting content relevant to the user's fields of interest.

9. The method according to claim 8 wherein each of said predetermined user's profiles comprises a combination of requested video resolution and currently available bandwidth.

10. The method according to claim 8 comprising a step of analyzing sensed user's journey, classifying consumed video content and indicating user's fields of interest.

11. The method according to claim 8, wherein said sensed user's journey is selected from the group consisting of video resolution, field of view, viewing time, viewing angles, currently available bandwidth and any combination thereof.

12. The method according to claim 8, wherein said scene comprises at least one video frame.

13. The method according to claim 8, wherein said step of modifying comprising foveated rendering said sequence of scenes according to said sensed user's journey.

14. The method according to claim 8 comprising a step of identifying said end user.

15. The method according to claim 8 wherein of said predetermined user's profiles further comprises average bit rate.

16. The method according to claim 8 wherein of said predetermined user's profiles further comprises viewing angles.

17. The method according to claim 8 wherein of said predetermined user's profiles further comprises device type.

* * * * *